United States Patent [19]
Lemper

[11] Patent Number: 5,457,893
[45] Date of Patent: Oct. 17, 1995

[54] WIDTH MEASURING DEVICE FOR SLAB BEING DISCHARGED FROM SLAB CASTERS

[75] Inventor: Herbert Lemper, McMurray, Pa.

[73] Assignee: Danieli United, Inc., Pittsburgh, Pa.

[21] Appl. No.: 192,252

[22] Filed: Feb. 7, 1994

[51] Int. Cl.⁶ .................................................. G01B 5/04
[52] U.S. Cl. ......................... 33/783; 33/501.02; 33/501.03
[58] Field of Search ............................. 33/783, 803, 810, 33/811, 501.02, 501.03, 551, 552, 553, 554, 572

[56] References Cited

U.S. PATENT DOCUMENTS

| | | | |
|---|---|---|---|
| 2,184,035 | 12/1939 | Buccicone | 33/501.02 |
| 2,522,877 | 9/1950 | Ladrach | 33/501.03 |
| 2,848,815 | 8/1958 | Scheu | 33/501.03 |
| 3,233,328 | 2/1966 | Schooley . | |
| 3,550,279 | 12/1970 | Fapiano | 33/501.03 |
| 3,581,402 | 7/1971 | London et al. | 33/501.03 |
| 4,528,756 | 7/1985 | Achihara | 33/501.03 |
| 4,974,333 | 12/1990 | Ginzburg | 33/501.02 |
| 5,287,631 | 2/1994 | Stade | 33/810 |

FOREIGN PATENT DOCUMENTS

| | | | |
|---|---|---|---|
| 37138 | 10/1968 | Finland | 33/783 |
| 1482052 | 5/1967 | France | 33/783 |
| 1118978 | 12/1961 | Germany | 33/783 |

*Primary Examiner*—Thomas B. Will
*Attorney, Agent, or Firm*—Armstrong, Westerman, Hattori, McLeland & Naughton

[57] ABSTRACT

Apparatus for continuously measuring the width of a continuously cast steel slab moving along a roller table including a pair of measuring rolls slidably mounted to a guide rail, one on each side of the slab, and further including an air cylinder interconnected between the two measuring rolls adapted to bias the measuring rolls towards each other sufficient to bring them into contact with, and roll against, the slab sides while the slab is in motion, so that the distance between the contacting surfaces of the measuring rolls will be a measure of the slab width. The slidably mounted cylinder permits measuring roll contact with a slab that is not travelling on center of a roller table.

13 Claims, 3 Drawing Sheets

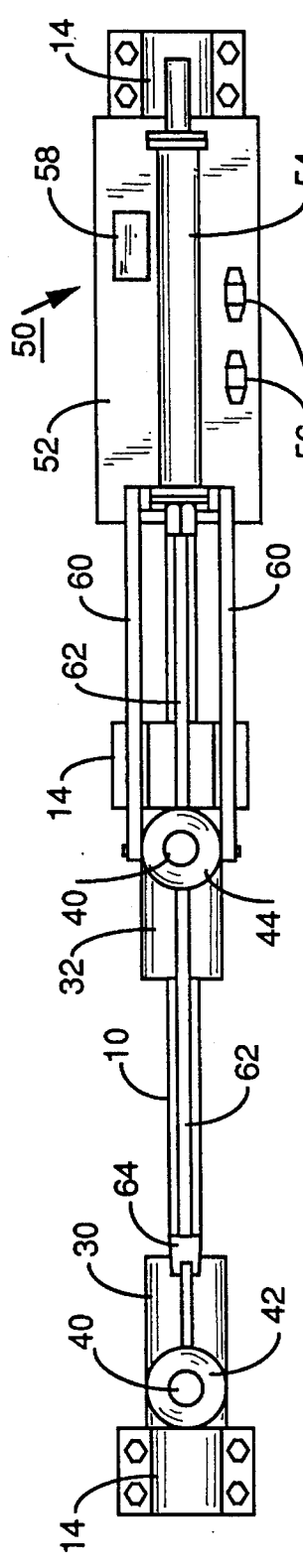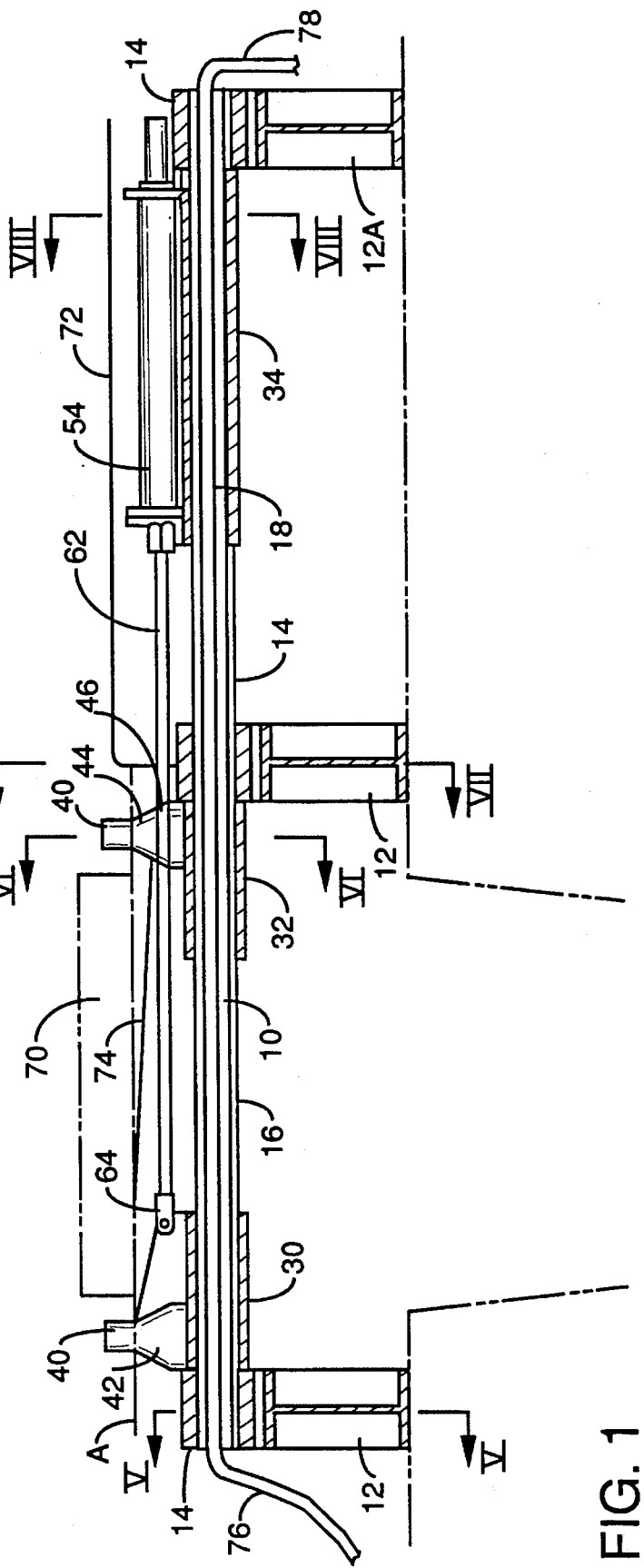

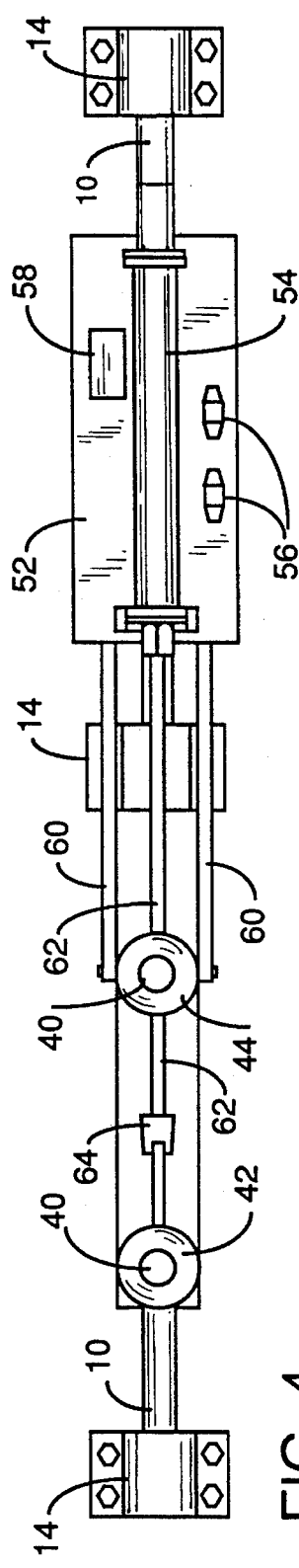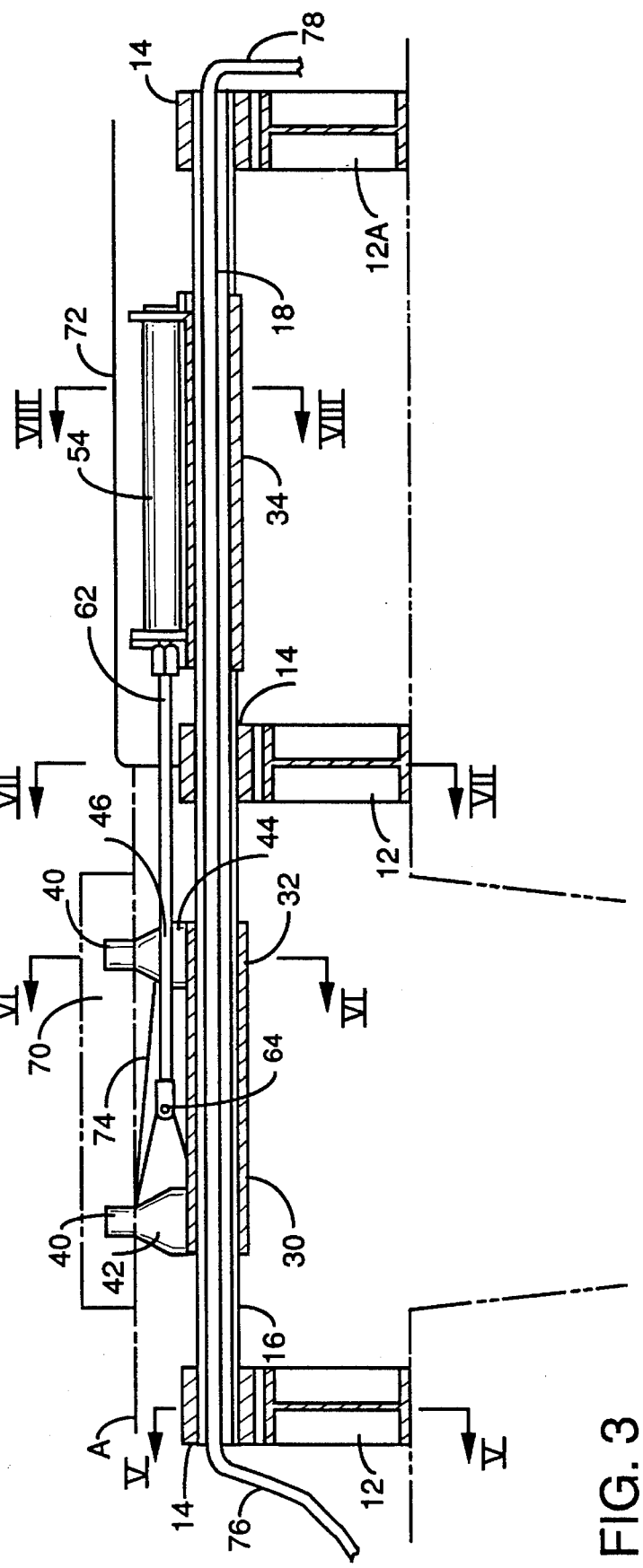

5,457,893

WIDTH MEASURING DEVICE FOR SLAB BEING DISCHARGED FROM SLAB CASTERS

BACKGROUND OF THE INVENTION

1. Field of the Invention

This invention relates generally to apparatus for continuously measuring and/or monitoring the width of a slab being discharged from a slab caster. More particularly, this invention relates to a new and improved device or apparatus for in-process monitoring of the width of such a slab, hot or cold, which will permit continuous or intermittent measurement to achieve closer process controls to improve yield and product quality, and which can readily be attached to a conventional roller table upon which such workpieces are normally conveyed during processing.

2. Description of the Prior Art

In state of the art continuous casting of steel slabs, adjustable mold sides are normally provided which can be set and adjusted to provide an opening that will theoretically produce the desired slab cross-sectional dimensions. While the slab thickness is normally adjusted by altering the width of the narrow faced mold sides; i.e., utilizing different mold sides having differing widths, the slab width in most casters can be changed in-process by adjusting the positions of the narrow faced mold sides. Specifically, the two narrow faced mold sides are adjustably mounted between the two wide faced mold sides so that the distance between them can be adjusted to vary the resulting slab width.

It is known, however, that there are a number of different factors involved in continuous slab casting, independent of the caster mold setting, that can cause shrinkage of the slab or otherwise influence the dimensional parameters of the cast slab such as mold wear, heat transfer conditions, and mold distortion due to thermal and mechanical strain, as well as down-stream secondary cooling conditions. It is further known that these factors can and do change and vary during a given casting operation. As a result, it is very difficult to accurately predict the discharge dimensions of any continuously cast slab.

Since it is intended that the slabs will be further rolled into semi-finished and finished steel products whereby the thickness will be greatly reduced, the exact thickness dimension of the continuous cast slab is not particularly critical. The width of the slab, however, is not normally reduced in the subsequent rolling operations, at least for the production of flat rolled products such as strip and sheet products. It is critical therefore, that in such rolling operations the starting slabs have a given minimum starting width as necessary to achieve the desired end width in the finished product, and the slab width is, therefore, a more critical dimension to achieve.

In order to assure that the continuous cast slabs will have a defined minimum width, it has been normally necessary to adjust the mold sides to produce a somewhat excessive slab width to thereby accommodate for any large degree of shrinkage that may occur, but yet may not. As a result of this practice, there may be considerable yield losses when slabs are produced and sold at widths in excess of the ordered width.

In current continuous slab casters, a measuring device is normally provided at a horizontal roller table over which the cast slabs pass for the purpose of periodically measuring the edge-to-edge width of the cast slab to assure specifications are being met. Such measuring devices are normally mounted on movable, position controlled, sideguards which can be activated to move against the two side surfaces of the slab and provide a reading of the slab width at the area of measurement. At best, such measuring devices provide a measure of the maximum width within the slab length contacted by the sideguards. In addition, such prior art width measuring devices may require that the slab movement on the roller table be stopped in order to make the measurement, and an undesired passage of time occurs while the measuring device is activated to close on the side surfaces of the slab to make the measurement and thereafter to be withdrawn to permit further processing. Accordingly, such prior art measuring devices provide only a periodic measurement of the slab width as a statistical check. While some of the more recently developed measuring devices are designed to provide a continuous measurement of a slab in motion, the mechanical mechanisms to effect such a continuous measurement normally comprise a rather complicated linkage to bias a pair of measuring wheels against the sides of the slab in motion, and specific modifications of the roller table to permit their installation. Accordingly, such prior art devices leave something to be desired in simplicity and ease of installation.

SUMMARY OF THE INVENTION

This invention is predicated upon a new and improved apparatus for continuously or periodically measuring and/or monitoring the width of a continuous cast slab as the slab is in motion moving along a roller table. Since the slab width can be continuously monitored, variation in slab width over minor lengths can be readily detected, as well as trends in width changes, to permit closer control of the caster mold settings to thereby permit closer process controls to improve yield. The measuring device of this invention is not mounted to movable sideguards or other position controlled devices which must be activated to function. The apparatus of this invention can easily be mounted to an existing roller table to measure the slab width, or the width of any other mill product such as plate, strip or sheet product, either intermittently or continuously. By utilizing the apparatus of this invention to monitor the slab width continuously or at very close intermittent intervals, the width variations or changing width trends can be very closely monitored to thereby adjust the caster mold width setting during the casting operation and better control the resulting slab width to minimize the amount of overwidth slabs and optimize the yield.

BRIEF DESCRIPTION OF THE DRAWINGS

FIG. 1 is an elevational side view (shown in partial cross-section) of the measuring apparatus according to one embodiment of this invention mounted transversely on a roller table, and further showing the slab width measuring rolls in a wide open position on either side of a slab (shown in dotted lines) centered on the roller table.

FIG. 2 is a plan view of the apparatus as it is shown in FIG. 1.

FIG. 3 is the same as that shown in FIG. 1 except that the slab width measuring rolls are shown in the fully closed position without a slab on the roller table.

FIG. 4 is a plan view of the apparatus as it is shown in FIG. 3.

DETAILED DESCRIPTION OF THE INVENTION

Figure 5:
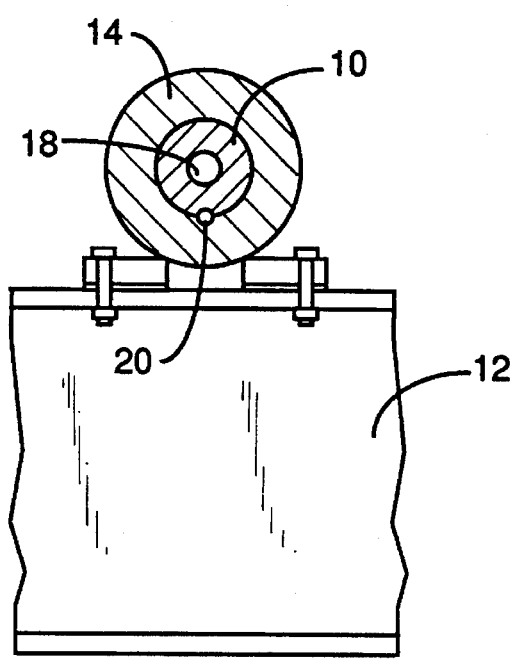
FIG. 5 is a cross-sectional end view of the apparatus shown in FIGS. 1 and 2 at section line V—V.
Figure 7:
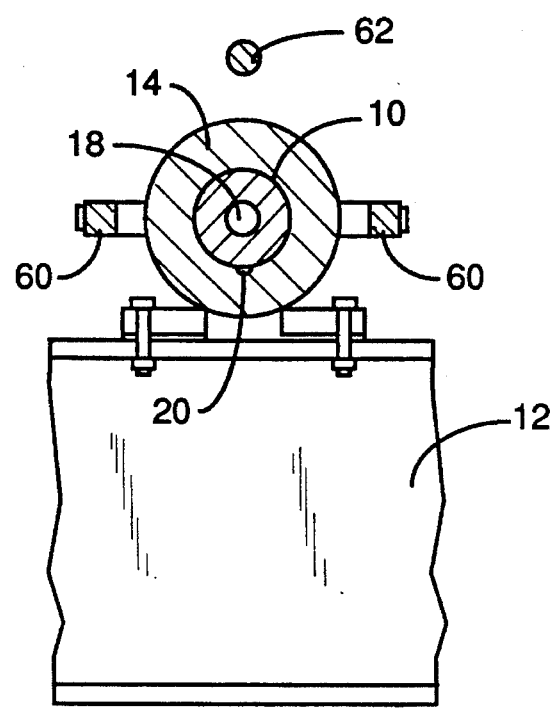
FIG. 7 is a cross-sectional end view of the apparatus shown in FIGS. 1 and 2 at section line VII—VII.

Reference to the figures will illustrate a slab measuring apparatus in accordance with one simplified embodiment of this invention, which comprises a guide rail 10 supported transversely on top of table beams 12 of a conventional roller table. The rolls (not shown) on conventional roll tables are normally spaced apart by a distance more than sufficient to permit guide rail 10 to be mounted to the rails 12 at any selected position between a pair of adjacent rolls. While the roller table rolls are not shown, line A represents the upper plane of contact of the table rolls and accordingly the plane on which the slabs roll. In the embodiment shown, an additional table beam 12A is provided to support one end of guide rail 10 which extends away from the roller table. In this embodiment, guide rail 10 has a cylindrical cross-section and is held in place by three bearing caps 14 bolted to the upper surface of the top flange of each table beam 12 and extra beam 12A. Each bearing cap 14 is provided with a cylindrical opening through which cylindrical guide rail 10 is positioned and secured. A key-way 16 extending the full length of the guide rail 10 at the lowermost surface is designed to mate with a key-way in each cylindrical opening through bearing caps 14 so that cylindrical guide rail 10 can be keyed and locked in place at bearing caps 14 by keys 20 (FIGS. 5 and 7). As shown in FIGS. 5 and 7, cylindrical guide rail 10 is preferably provided with an axial opening 18 extending the full length for purposes of circulating cooling water, as described below.

Figure 8:
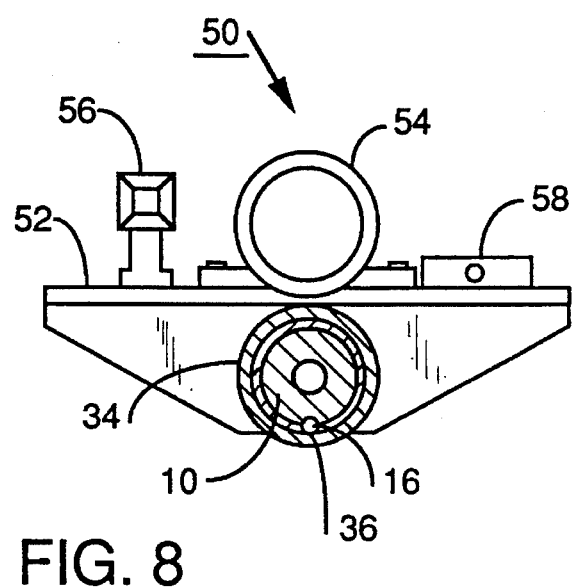
FIG. 8 is a cross-sectional end view of the apparatus shown in FIGS. 1 and 2 at section line VIII—VIII.

Two guide rail followers, such as cylindrical slider tubes 30 and 32 are snugly but slidably mounted onto cylindrical guide rail 10 between the two bearing caps 14 mounted to the two roller table beams 12, while a third guide rail follower, such as slider tube 34 is snugly but slidably mounted onto cylindrical guide rail 10 between the extra beam 12A and the adjacent roller table beam 12. Each of the slider tubes 30, 32 and 34 are provided with keys 36 (FIGS. 7 and 8) extending upwardly from the cylindrical inner surface designed to fit within key-way 16 in the lower surface of guide rail 10 so that the slider tubes 30, 32, and 34 are not free to rotate on the surface of guide rail 10, but are free to slide axially along its length within the confines of the bearing caps 14.

A slab width measuring roll 40, having its axis oriented vertically, is secured at the upper surface of each of the two slider tubes 30 and 32 spaced by measuring roll bases 42 and 44. The slab width measuring rolls 40 are provided with a cylindrical outer surface intended to be brought into contact with the side surfaces of a slab positioned therebetween, and are rotatably mounted to the measuring roll bases 42 and 44 so that they are free to rotate on their vertical axes when in contact with and measuring the width of a slab in motion, thereby rolling along each slab edge surface.

A reciprocal drive means, such as air cylinder assembly 50 is rigidly secured to the upper surface of slider tube 34. The air cylinder assembly 50 comprises horizontally disposed base plate 52 secured directly to the top of slider tube 34, an air cylinder 54 having its axis parallel to and directly over the axes of the slider tubes 30, 32, and 34 and guide rail 10, and air valves 56 for admitting compressed air to air cylinder 54 for activating and deactivating the apparatus. A grease distributor 58 is also preferably provided for distribution of grease to sliding interfaces within the apparatus.

Figure 6:
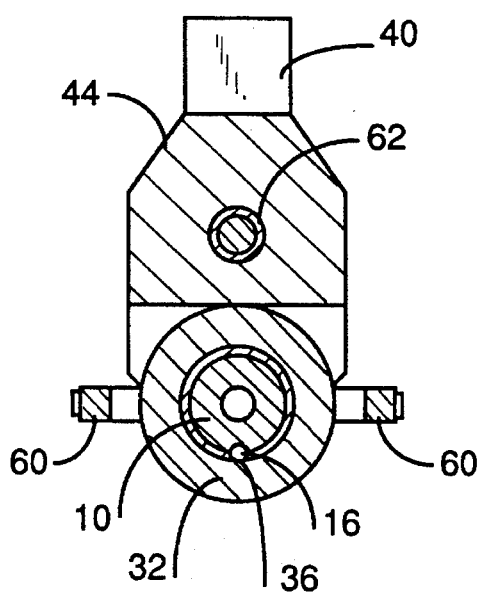
FIG. 6 is a cross-sectional end view of the apparatus shown in FIGS. 1 and 2 at section line VI—VI.

As shown in the two plan views of FIGS. 2 and 4 and the sectional views of FIGS. 6 and 7, a pair of extension links 60 are rigidly secured between the forward outer edges of air cylinder 54 and the outer edges of measuring roll base 44, so that the position of measuring roll base 44, and accordingly measuring roll 40 thereon, are fixed with respect to air cylinder 54. Accordingly, any movement in either direction of measuring roll base 44 and the measuring roll 40 thereon along the length of guide rail 10 will cause an identical movement of air cylinder 54. The forward end of reciprocating cylinder rod 62, activated by air cylinder 54, on the other hand, is secured to measuring roll base 42 at pivot link 64. As can be seen, this connection will require that an opening 46 be provided through measuring roll base 44 through which cylinder rod 62 can reciprocate, preferably without contacting measuring roll base 44.

In view of the above description, it can be seen that when compressed air is admitted to the rearward end of air cylinder 54 causing cylinder rod 62 to be advanced out of air cylinder 54, measuring roll base 42 will be pushed away from the center line of the roller table to the maximum point where measuring roll base 42 comes into contact with, and is stopped by, the adjacent bearing cap 14 on beam 12 shown at the left of FIG. 1. At the same time or thereafter, measuring roll base 44 is moved in the opposite direction until it comes into contact with, and is stopped by, the other bearing cap 14 on the other beam 12, as shown at the right of FIG. 1. The air cylinder assembly 50 will move in unison with measuring roll base 44. In this described position, measuring rolls 40 are spaced as far apart as they will go and are, therefore, in the fully open position as illustrated in FIGS. 1 and 2. When compressed air is admitted to the forward end of air cylinder 54 such that cylinder rod 62 is forced back into air cylinder 54, the exact opposite motions will be effected, with measuring roll bases 42 and 44 moving towards each other until they abut and stop somewhere in the vicinity of the roll table centerline, as illustrated in FIGS. 3 and 4. When a slab 70 is in position on the roller table, however, as shown in FIG. 1, activation of air cylinder 54 as will cause measuring rolls 40 to move towards each other towards a closed position, will cause the measuring rolls 40 to come into contact with the sides of slab 70 as necessary to measure the slab width at the plane of contact. It should be appreciated that when the air cylinder 54 is activated in either direction, and there is no physical obstruction to the movement of either measuring roll base 42 and 44 or the measuring rolls 40 thereon, that measuring roll base 42 will normally be the one that moves without any movement of measuring roll base 44, until it encounters an obstruction; e.g., a slab 70 or the adjacent bearing cap 14, and only then will measuring roll base 44 move. This results, of course, because there is less friction resistance to the movement of slider tube 30 alone, as compared to the combined movement of slider tubes 32 and 34. Because measuring roll base 42 and 44 and air cylinder assembly 50 are all slidably mounted onto guide rail 10, it can be seen that regardless of the order of movement, the measuring rolls 40 will eventually engage the sides of slab 70 with equal contact pressure in proportion to the air pressure applied to the air cylinder 54, whether or not slab 70 is directly centered on the roll table.

In normal operation when slab 70 is in motion moving along the roll table, compressed air is maintained to the forward end of air cylinder 54 as necessary to cause measuring rolls 40 to be biased towards the closed position so that they will be in constant contact with the edges of slab 70. Any changes in the width of slab 70 will cause measuring rolls 40 to spread apart or move together as necessary to maintain engagement with the sides of slab 70, to thereby providing a constant reading of the slab width.

For purposes of actually measuring the width of slab 70, a number of different means can be provided for measuring the distance between the inner surfaces of measuring rolls 40, and accordingly the width of slab 70. For example, a linear transducer (not shown) can be utilized for determining and noting the degree to which cylinder rod 62 is extended from air cylinder 54. Any such technique is within the skill of the art and need not be detailed here. For purposes of controlling the caster mold settings, a suitable mold processor-controller (not shown) and a processor-computer (not shown) can be provided and programmed to adjust the mold settings with a suitable analog or digital control means to achieve the desired mold setting in response to the width measurement determined by the transducer. The ability to design such controls is within the skill of the art and need not be described in detail here.

Since the slab 70 being measured will normally be one which has just previously been cast, its temperature will normally be rather high; e.g. near 2,000° F., so that a certain degree of heat shielding will normally be necessary. While anyone skilled in the art will be able to design adequate heat shielding, FIGS. 1 and 3 illustrate examples of the most essential heat shielding that should be provided. For example, a heat shield such as heat shield 72 (shown in FIGS. 1 and 3, but not FIGS. 2 and 4) is preferably provided over air cylinder assembly 50, and slider tube 34, and a retractable heat shield 74 is preferably secured between measuring roll bases 42 and 44 to protect guide rail 10 and slider tubes 30 and 32. In addition to that described and other possible forms of suitable heat shielding, it is also highly preferable that the apparatus be water cooled. As shown in the embodiment illustrated in the figures, this can be done by providing a cooling water inlet 76 at one end of opening 18 and a cooling water outlet 78 at the opposite end so that cooling water can be circulated through guide rail 10.

With an understanding of the above detailed description, the unique advantages of this invention should become readily apparent. In particular, the measuring apparatus of this invention is capable of providing a continuous slab width measurement throughout the entire length of the slab. Since the measurement is taken by rolls in rolling contact with the slab sides there is no damage to the slab as a result of making the measurement while the slab is in motion. Because the air cylinder as well as the measuring rolls are slidably mounted to the guide rail, it is not necessary that the slab be centered on the rolling table and equal contact pressure is assured on each side of the slab. The only power supply needed to activate the apparatus is air pressure, while an electrical lead, cooling water and grease are the only required additional utilities. The structure is extremely simple, easy to maintain and easy to install on practically any roller table or other such base structure over which the slab passes.

In further view of the above described embodiment of the invention, it should be further apparent that numerous modifications and alternate embodiments could be designed and used without departing from the spirit of the invention. For example, the guide bar 10, as well as any of the other component could be provided in other forms, and the reciprocating control means, such as the air cylinder 54, could be directly incorporated into one of the measuring roll bases to thereby eliminate the need to independently mount the control means on the guide bar and that portion of the guide bar extending beyond the edge of the roller table supported by beam 12A. This would, of course, eliminate any need for such a beam 12A, and heat shield 72. As an alternative to the air cylinder 54, a number of other reciprocating control means could be utilized, including a hydraulic cylinder. Since a hydraulic fluid is not compressible, however, a pressure release means would have to be included to permit the measuring rolls to move against the pressure to permit them to follow the slab sides regardless of width without damage to the apparatus and slab side surfaces.

While the above detailed description of an embodiment of the invention has been limited to an application for measuring the width of a hot continuously cast slab, it should be appreciated that other embodiments of the invention can be devised to measure other dimensions and parameters; e.g., slab thickness, or dimensions and parameters of other mill products such as plate, sheet and strip products, whether hot or cold. Particularly in the hot rolling of sheet and strip products, a need exists to measure and monitor the product width in order to control process variables and improve product quality. It should be readily apparent that the apparatus of this invention would be particularly applicable to the hot rolling of such sheet and strip products.

What is claimed is:

1. A measuring apparatus for measuring and monitoring one dimension of a metal workpiece as the workpiece is conveyed along a workpiece line of travel, the apparatus comprising: a guide rail rigidly secured adjacent to, and transversely of, the workpiece line of travel; first and second guide rail followers reciprocally slidably attached to said guide rail such that said first and second guide rail followers can be slidably moved on said guide rail in a single line of movement parallel to said guide rail; each of said first and second guide rail followers having a measuring roll rotatably secured thereto on an axis of rotation extending transversely through the workpiece line of travel and parallel to two opposing surfaces of the workpiece, with one such measuring roll being adjacent each of such opposing surfaces; a third guide rail follower reciprocally slidably mounted on the guide rail, and a reciprocally movable drive means rigidly secured to the third guide rail follower and interconnected between said first and second guide rail followers such that the third guide rail follower and associated drive means slidably moves in unison with the first guide rail follower and the second guide rail follower can slidably move independently of movement of the first and third guide rail followers, said drive means adapted to selectively cause said first and second guide rail followers to be moved apart placing the measuring rolls in a fully open position, or alternatively brought together such that said measuring rolls are biased against each of such opposing surfaces of the workpiece so that the relative positions of said measuring rolls will be indicative of the distance between such two opposing surfaces of the workpiece.

2. A measuring apparatus according to claim 1 in which said guide rail followers are slidably attached to said guide rail and adapted for sliding motion along said guide rail.

3. A measuring apparatus according to claim 2 in which said guide rail is cylindrical in cross-section and each of said guide rail followers are provided with a cylindrical opening which is snugly but slidably fitted to said cylindrical guide rail.

4. A measuring apparatus according to claim 1 in which said measuring rolls are provided with a cylindrical outer surface adapted to be biased against such opposing surfaces of the workpiece and roll along such surfaces while in contact with the workpiece in motion.

5. A measuring apparatus according to claim 1 in which said guide rail is rigidly secured to a roller table upon which the workpiece is caused to move.

6. A measuring apparatus for measuring and monitoring the width of a continuous cast slab as the slab is conveyed along a roller table in a given slab line of travel, the apparatus comprising: a guide rail regidly secured to said roller table adjacent to, and transversely of, the line of travel; first and second guide rail followers reciprocally slidably attached to said guide rail such that said first and second guide rail followers can be moved on said guide rail in a single line of movement parallel to said guide rail; each of first and second guide rail followers having a measuring roll rotatably secured thereto on an axis of rotation extending transversely through the slab line of travel and parallel to two side surfaces of the slab, with one such measuring roll being adjacent each of the side surfaces of the slab; a third guide rail follower reciprocally slidably mounted on the guide rail, and a reciprocally movable drive means rigidly secured to the third guide rail follower and interconnected between said first and second guide rail followers such that the third guide rail follower and associated drive means slidably moves in unison with the first guide rail follower and the second guide rail follower can slidably move independently of movement of the first and third guide rail followers, said drive means adapted to selectively cause said first and second guide rail followers to be moved apart placing the measuring rolls in a fully open position, or alternatively brought together such that said measuring rolls are biased against each of the slab side surfaces so that the relative positions of said measuring rolls will be indicative of the distance between the side surfaces of the slab.

7. A measuring apparatus according to claim 6 in which said guide rail followers are slidably attached to said guide rail and adapted for sliding motion along said guide rail.

8. A measuring apparatus according to claim 7 in which said guide rail is cylindrical in cross-section and each of said guide rail followers are provided with a cylindrical opening which is snugly but slidably fitted to said cylindrical guide rail.

9. A measuring apparatus according to claim 6 in which said measuring rolls are provided with a cylindrical outer surface adapted to be biased against such side surfaces of the slab and roll along such surfaces while in contact with the slab in motion.

10. A measuring apparatus for measuring and monitoring one dimension of a metal workpiece as the workpiece is conveyed along a workpiece line of travel, the apparatus comprising: a guide rail rigidly secured adjacent to, and transversely of, the workpiece line of travel; a pair of guide rail followers reciprocally attached to said guide rail such that said guide rail followers can be moved in a single line of movement parallel to said guide rail; each of said guide rail followers having a measuring roll rotatably secured thereto on an axis of rotation extending transversely through the workpiece line of travel and parallel to two opposing surfaces of the workpiece, with one such measuring roll adjacent to each of such opposing surfaces; a reciprocal drive means comprising an air cylinder having a reciprocal cylinder rod in which said air cylinder is rigidly secured to a first of said guide rail followers and said reciprocal cylinder rod is secured to a second of said guide rail followers, said reciprocal drive means adapted to selectively cause said guide rail followers to be moved apart placing the measuring rolls in a fully open position, or alternatively brought together such that said measuring rolls are biased against each of such opposing surfaces of the workpiece so that the relative positions of said measuring rolls will be indicative of the distance between such two opposing surfaces of the workpiece.

11. A measuring apparatus according to claim 10 in which said air cylinder is mounted onto a third guide rail follower such that said first guide rail follower having the measuring roll thereon will move in unison with said third guide rail follower having said air cylinder thereon.

12. A measuring apparatus for measuring and monitoring the width of a continuous cast slab as the slab is conveyed along a roller table in a given slab line of travel, the apparatus comprising: a guide rail rigidly secured to said roller table adjacent to, and transversely of, the line of travel; a pair of guide rail followers reciprocally attached to said guide rail such that said guide rail followers can be moved in a single line of movement parallel to said guide rail; each of said guide rail followers having a measuring roll rotatably secured thereto on an axis of rotation extending transversely through the slab line of travel and parallel to two side surfaces of the slab, with one measuring roll adjacent each of the side surfaces; a reciprocal drive means comprising an air cylinder having a reciprocal cylinder rod in which said air cylinder is rigidly secured to a first of said guide rail followers and said reciprocal cylinder rod is secured to a second of said guide rail followers, said reciprocal drive means adapted to selectively cause said guide rail followers to be moved apart placing the measuring rolls in a fully open position, or alternatively brought together such that said measuring rolls are biased against each of the slab side surfaces so that the relative positions of said measuring rolls will be indicative of the distance between the side surfaces of the slab.

13. A measuring apparatus according to claim 12 in which said air cylinder is mounted onto a third guide rail follower such that said first guide rail follower having the measuring roll thereon will move in unison with said third guide rail follower having said air cylinder thereon.

* * * * *